United States Patent [19]
Bae

[11] Patent Number: 5,309,238
[45] Date of Patent: May 3, 1994

[54] PICTURE SUPERPOSING CIRCUIT

[75] Inventor: Jeom-han Bae, Kyunggi, Rep. of Korea

[73] Assignee: Samsung Electronics Co. Ltd., Kyungki, Rep. of Korea

[21] Appl. No.: 737,992

[22] Filed: Jul. 30, 1991

[30] Foreign Application Priority Data

Aug. 14, 1990 [KR] Rep. of Korea .................. 90-12293

[51] Int. Cl.$^5$ .......................... H04N 9/74; H04N 5/268
[52] U.S. Cl. .................................... 348/588; 348/205; 348/578
[58] Field of Search ............ 358/22 C, 22 CR, 220IP, 358/22, 183, 181, 148, 149; H04N 9/74, 5/268

[56] References Cited

U.S. PATENT DOCUMENTS

| | | | |
|---|---|---|---|
| 3,654,386 | 4/1972 | Baum | 358/183 |
| 4,575,771 | 3/1986 | Oota et al. | 358/181 |
| 4,713,695 | 12/1987 | Macheboeuf | 358/183 |
| 4,724,487 | 2/1988 | Casey | 358/183 |
| 4,992,781 | 2/1991 | Iwasaki et al. | 358/183 X |
| 5,041,910 | 8/1991 | Suda et al. | 358/181 |

FOREIGN PATENT DOCUMENTS

| | | |
|---|---|---|
| 2244624 | 9/1972 | Fed. Rep. of Germany . |
| 2945991C2 | 11/1979 | Fed. Rep. of Germany . |
| 3446146C1 | 12/1984 | Fed. Rep. of Germany . |
| 3619799C2 | 6/1987 | Fed. Rep. of Germany . |
| 1533238 | 11/1978 | United Kingdom ................ 358/181 |

Primary Examiner—James J. Groody
Assistant Examiner—Safet Metjahic
Attorney, Agent, or Firm—Robert E. Bushnell

[57] ABSTRACT

A picture superposing circuit for receiving a main video signal and a sub-video signal respectively representative of two different picture images and storing the sub-video signal in a field memory and thereafter reading out according to a main synchronization signal to display the main video signal from an odd field and the sub-video signal from an even field of one frame so that two pictures can be superposed on a single screen.

25 Claims, 2 Drawing Sheets

PICTURE SUPERPOSING CIRCUIT

BACKGROUND OF THE INVENTION

This invention relates to picture superposing circuits and more particularly relates to a picture superposing circuit for displaying two pictures superposed on a screen by constituting a video signal frame with two video signal fields having different picture information from each other.

Among the digital image processing techniques, the PIP (Picture-In-Picture) technique, wherein a reduced picture is inserted within the main picture, is usually used to display two pictures on one screen.

Other digital image processing techniques are also provided for the viewer to choose between diverse special effects functions, e.g., an art technique for transforming a holograph image into a painting-like picture by controlling the intensity of the luminance signal of the image signal and a mosaic technique to build an image of many picture bits. These techniques are, however, unable to simultaneously display two full-size pictures on a single screen.

SUMMARY OF THE INVENTION

It is an object of this invention to provide a picture superposing circuit for simultaneously displaying two full-sized pictures superposed on a single screen.

In order to accomplish the above mentioned object, the picture superposing circuit of this invention comprises, an input means which receives two distinct video signals which correspond to different pictures, for selecting one for a main video signal and the other for a sub-video signal;

a memory for storing the sub video signal supplied from the input terminal, a control switch for mixing the above sub video signal stored in the memory with the man video signal supplied from the input terminal; and an even/odd controller for detecting the synchronization status of the main video signal supplied from the input terminal and turning the control switch on and off with respect to each field.

BRIEF DESCRIPTION OF THE DRAWINGS

In order that the invention may be more fully understood, reference will now be made, by way of example, to the accompanying drawings, of which.

DETAILED DESCRIPTION OF THE PREFERRED EMBODIMENTS

Figure 1:
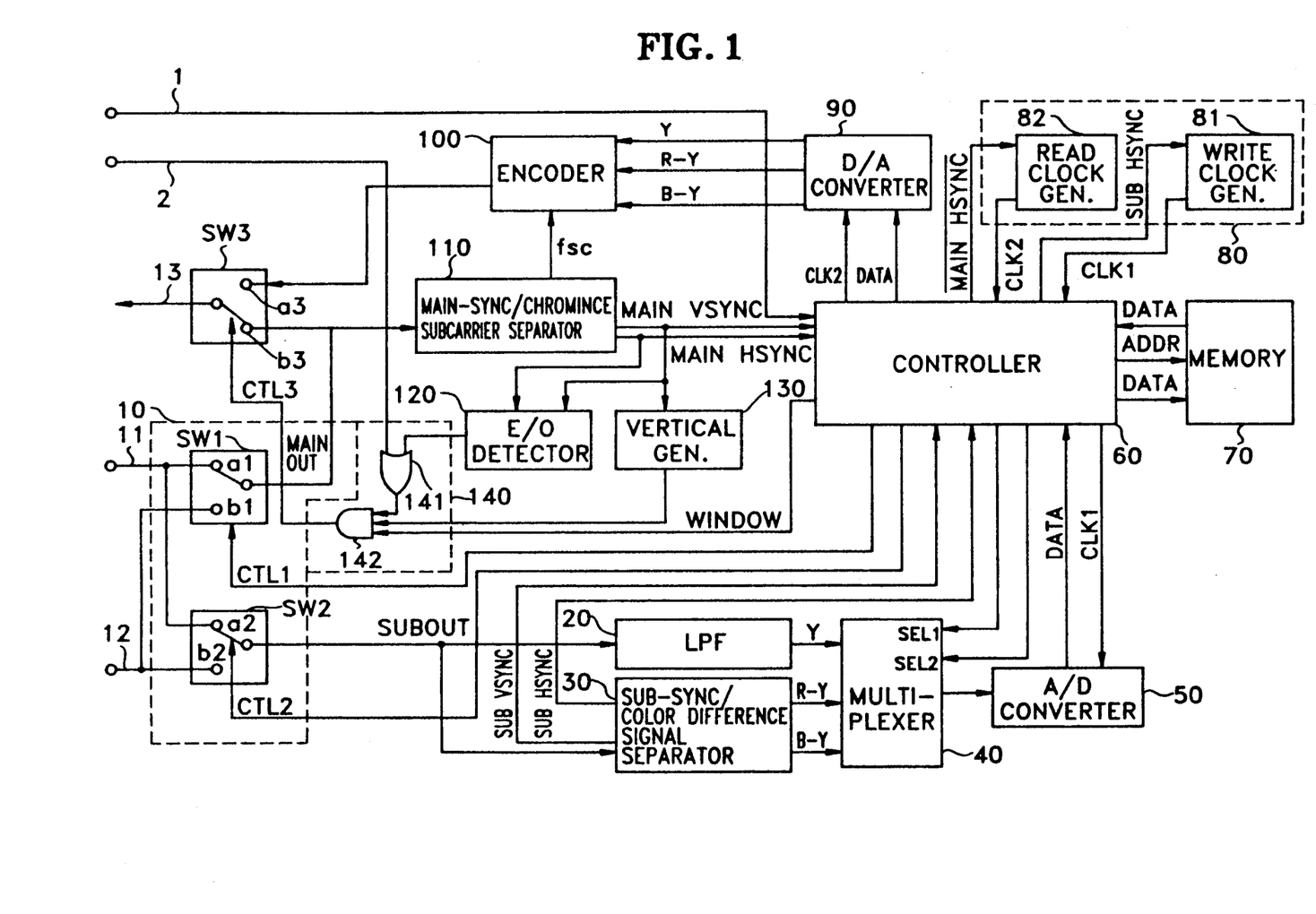
FIG. 1 is a block diagram showing a preferred embodiment of the picture superposing circuit of this invention.

Referring to FIG. 1, the structure of the present embodiment is now described.

In FIG. 1, a first video input terminal 11 which receives a first video signal (in this embodiment, the main video signal) from a source not shown in FIG. 1, is connected to contacts points a1 and a2 of a first and second control switches SW1 and SW2 while another input terminal 12 which receives a second video signal (in this embodiment, the sub video signal) from another source also unshown, is connected to contact points b1 and b2 of the first and second control switches SW1 and SW2.

The first control switch SW1 is connected to a contact point b3 of a third control switch SW3 and also to the input of a main synchronization/chrominance subcarrier separation section 110.

The second control switch SW2 is coupled to a low-pass filter 20 and to an input of a sub-synchronization/color difference signal separation section 30 having first and the second output terminals respectively connected to a control section 60 formed in a gate array to provide a sub-vertical and a sub-horizontal synchronization signals.

The control contacts of the first control switch SW1 and the second control switch SW2 both receive commands from the control section 60, A multiplexer 40 having a first input signal supplied by the output of the low-pass filter 20, a second and a third input signals respectively supplied by a third output and a fourth output of the sub-synchorinzation/color difference signal separation section 30 first and second selection input signals SEL1 and SEL2 the supplied by outputs of a control section 60 and an output terminal coupled to an input terminal of an A/D converter 50.

A digital data output and a sampling clock input of the A/D converter 50 are both connected to the control section 60.

The digital data input and output, together with an address input of a memory section 70 are also connected to the control section 60.

The input and output signals of a write clock pulse generator 81 are coupled to the control section 60.

The input and output signals of a read clock pulse generator 82 are coupled to the control section 60.

A digital data input and a sampling clock input of a D/A converter 90 are both supplied by the control section 60. Also, a first, a second, and a third output of the D/A converter 90 are supplied to an encoder 100

A first and a second output of the main synchronization/chrominance subcarrier separation section 110 each provide main sync signals to a main horizontal and vertical synchronization signal input of the control section 60, and also to inputs of an Even/Odd detector 120 hereinafter referred to as the E/O detector).

The input terminal of a vertical banking signal generator 130 receives its input from a first output terminal of the main synchronization chrominance subcarrier separator 110 while its output is supplied to a second input of an AND gate 142. A chrominance subcarrier from a third output of the main synchronization/chrominance subcarrier separator 110 is supplied to the encode 100.

A first input of an OR gate 141 is supplied with a control signal from input terminal 2 of a system controller (not shown in the drawings) and a second input with the output of the E/O detector 120 while the output of the OR gate 141 is coupled to a first input terminal of the AND gate 142.

A third input of the AND gate 142 receives a window signal from an output of the control section 60 while its output is supplied to the control of the third switch SW3.

A first contact point a3 of the third control switch SW3 is connected to the output of the encode 100 so that the video signal can be supplied through an output terminal 13.

A control command from input terminal 1 from the system controller is supplied to the control section 60.

Figure 2:
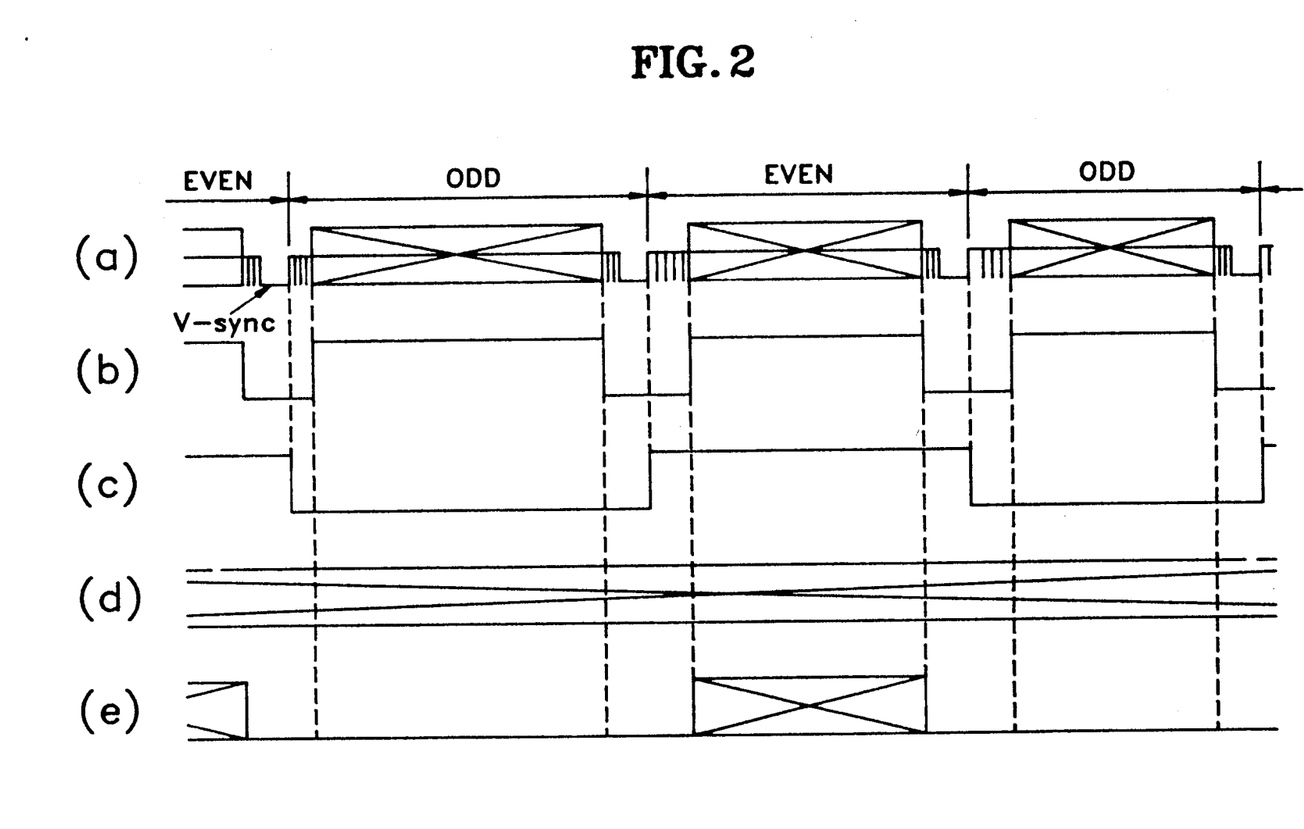
FIG. 2 illustrates operating waveforms at various points of the picture superposing circuit of FIG. 1.

FIG. 2 shows operating waveforms of the picture superposing circuit according to FIG. 1.

FIG. 2(a) shows waveforms of the main video signal supplied from the first video output terminal 11, FIG. 2(b) illustrates the waveform of vertical blanking signal supplied by the vertical blanking signal generator 130, FIG. 2(c) shows the waveform of the output of the E/O detector FIG. 2(d) shows the waveform of the window signal outputted from the control section 60 and FIG. 2(e) shows the waveform of the output of a superposing control signal generating section 140.

Referring now to FIG. 1 and the waveforms of FIG. 2(e), operation of the picture superposing circuit of the present invention.

According to FIG. 1, the first control switch SW1 selects a first video signal for a main screen among two video signals carrying different picture information in accordance with the first control signal CTL1 supplied from the control section 60 and then transfers the selected signal to main synchronization/chrominance subcarrier separation section 110 and to the second contact point b3 of the third control switch SW3. Here, the vertical and horizontal synchronization signals of the first video signal are out of phase with those of the second video signal.

In the meantime, the second control switch SW2 in an input section 10 switches a second video signal on for the sub screen in accordance with the second control signal CTL2 supplied from the control section 60 and then transfers the selected sign to the low-pass filter 20 and the sub-synchronization/color difference signal separation section 30.

Simultaneously, the first control switch SW1 can select the second video signal for the main screen in accordance with the first control signal CTL1 supplied from the control section 60, and the second control switch SW2 can select the firs video control for the sub-screen in accordance with the second control signal CTL2 supplied from the control section 60.

The low-pass filter 20 filters off signals over 3 MHz so that the chrominance signal is eliminated and only the luminance signal Y is output to the multiplexer 40. The cut-off frequency of the low-pass filter is adjustable.

The sub-synchronization color difference signal separation section 30 separates the sub-synchronization signal and the color difference signal from the video signal for the sub-screen and then supplies both sub vertical and sub-horizontal synchronization signals to the control section 60, and outputs the color difference signals R-Y and B-Y to the multiplexer 40. The multiplexer 40 selects between the R-Y and B-Y signal according to the logic status of the control signal, e.g , "High" or "Low", input through the selection terminals SEL 1 and SEL 2 and then transmits the selected signal to the A/D converter 50.

The A/D converter 50 changes the analog luminance signal Y and the color difference signals R-Y or B-Y selected as digital signals and passes the result to the control section 60 synchronization with to the sampling clock signal CLK1 supplied from the control section 60.

In this operation, the sampling section 80 is responsive to both the sub-horizontal and main-horizontal synchronization signal, and the sampling clock signal is a write signal CLK1 which is generated in synchronization with the inverter sub horizontal synchronization signal in the writing clock generator 81.

Meanwhile, the memory section 70 stores the digitalized picture data in the designated address at a single it rate of the above write clock signal CLK1, according to the address signal provided by the control section 60, or reads out the stored digitized picture data at the bit rate of read clock signal CLK2 also provided by the control section 60.

The above read clock signal CLK2 is a clock pulse generated in synchronization with the inverted main horizontal synchronization signal in the read clock pluse generator 82. The D/A converter 90 converts the digitized picture data read out from the control section 60 according to the read clock signal CLK2 into the analog picture data having both a luminance signal and color-difference signals and thereafter supplies the luminance signal Y and color difference signals R-Y and B-Y to the encoder 100.

The main synchronization/chrominance subcarrier separation section 110 separates main synchronization signals and a chrominance subcarrier signal from the main video signal selected by the first control switch SW1 and transmits the main horizontal and vertical synchronization signals to the control section 60 and the chrominance subcarrier signal of 3.58 MHz to the encoder 100.

The encoder 100 encodes the luminance signal Y and the chrominance signals R-Y an B-Y in synchronous with the chrominance subcarrier signal of 3.58 MHz supplied from the main synchronization/chrominance subcarrier separation section 110 and then transfers the composite picture signal encoded as above to the first contact point a3 of the third control switch SW3.

The E/O detector 120 receives the main horizontal and vertical synchronization signals to distinguish between even fields or odd fields from the video signal of a frame an transmits the resultant signal to the first input terminal of the OR gate 141.

The waveform phase of the signal output from the E/O detector 120 alternates fields at the span between a leading edge of the vertical synchronization signal and the next one as shown in FIG. 2(c) so that "Low" logic signal is output at an odd field and "High" logic signal at an even field wherein an odd field appears when an equalizing pulse subsequent to the vertical synchronization signal detected by the E/O detector 120 is 3H, and an even field appears when the equalizing pulse is 3.5 H.

The vertical blanking signal generator 130 receives the main vertical synchronization signal supplied from the main synchronization/chrominance subcarrier separation section 110 and produces vertical blanking pulses as shown in FIG. 2(b) which eliminate the scanning lines resulting from the electron beam's vertical retracing while painting a field, and supplies them to the second input terminal of the AND gate 142.

During this operation, a control signal of a "Low" logic state is received from an outside control signal at an output terminal 2 for picture superposing while a control signal of a "High" logic state is supplied for other digital functions such as PIP, ART and MOSAIC. Accordingly, the picture superposing "Low" signal and the above signal from the E/O detector 120 are received by the OR gate 141 and the resultant logic sum is supplied to the first input of the AND ate 142.

The AND gate 142 receives the output signal of the OR ate 141, the vertical blanking signal and the window signal transmitted from the control section 60 as shown n FIG 2(d) to make a logical product and then outputs the third control signal CTL 3 which appears in FIG.

2(e). The above mentioned third control signal CTL 3 is a pulse signal having the same period as the horizontal synchronization signal although not illustrated in the figures.

In accordance with the third control signal CTL 3, the third control switch SW3 selects and outputs the main video signal as switched on by the first control switch SW1 during an odd field. selects and outputs the composite picture signal of the sub-picture signal from the encoder 100 to be displayed on a screen according to the main horizontal synchronization signal output from the main synchronization/chrominance subcarrier separation section 110. As the result, one picture is superpose on another picture in a single screen.

As described in detail as above the picture superposing circuit according to the invention is capable of displaying two pictures by reading out sub-video signals stored in the field memory in accordance with the main synchronization signal, the invention displays the main video signal during an odd field period and the sub-video signal during an even field period to enable both pictures to be superposed on a screen.

What we claim is:

1. A picture superposing circuit, comprising:
   input means for receiving information for two or more different pictures, said information containing a main video signal and a sub-video signal, and for selecting the main video signal for a main picture and the sub-video signal for a sub-picture;
   memory means for storing said sub-video signal supplied from said input means;
   switch means for enabling alternate transmission of an analog signal representative of said sub-video signal stored in said memory means and said main video signal supplied from said input means during a sequence of even and odd fields, in response to a control signal;
   even/odd control means for detecting synchronization status of said main video signal supplied from said input means to provide said control signal for controlling said switch means;
   first signal separator means for separating the sub-video signal supplied from said input means into a luminance signal, color-difference signals and sub-synchronization signals;
   second signal separator means for separating the main video signal supplied from said input means into main synchronization signals and a chrominance subcarrier;
   first converter means for converting the color-difference signals and the luminance signal into digital data representative of said sub-video signal;
   control means for enabling storing of said digital data in said memory means and reading out the stored digital data from said memory means; and
   second converter means for converting digital data read out from said memory means into said analog signal representative of said sub-video signal.

2. The picture superposing circuit as claimed in claim 1, further comprised of said control means writing the digital data in said memory means in accordance with said sub-synchronization signals and reading the stored digital data from said memory means in accordance with said main synchronization signals.

3. The picture superposing circuit as claimed in claim 1 wherein said input means comprises first and second control switches for selecting between the main video signal and the sub-video signal.

4. The picture superposing circuit as claimed in claim 1, further comprising:
   first clock pulse generator means for generating first clock pulses to said first converter means and to said control means to regulate writing of the digital data in said memory means; and
   second clock pulse generator means for generating second clock pulses to said second converter means and to said control means to regulate reading of the stored digital data from said memory means.

5. The picture superposing circuit as claimed in claim 4, wherein said first clock pulses are generated in synchronization with horizontal pulses of said sub-synchronization signals, and said second clock pulses are generated in synchronization with horizontal pulses of said main synchronizing signals.

6. The picture superposing circuit as claimed in claim 1, further comprised of said even/odd control means controlling said switch means to switch between said analog signal representative of said sub-video signal and said main video signal in accordance with said main synchronizing signals.

7. A picture superposing circuit, comprising:
   means for receiving first and second video signals;
   first switch means for enabling transmission of said first and second video signals to provide a first intermediate signal representative of a first one of said first video signal and said second video signal to be displayed as a first picture on a screen, and a second intermediate signal representative of a second different one of said first video signal and said second video signal to be displayed as a second picture on said screen;
   first picture controller means coupled to receive said first intermediate signal, for separating first vertical and horizontal synchronizing signals from said first intermediate signal to provide a control signal indicative of an odd and even state of a current field of said first intermediate signal in dependence upon reception of a command signal representative of a picture superposing function for a visual display with a selected one of said first and second video signals superimposed upon a different one of said first and second video signals on said screen;
   second picture controller means coupled to receive said second intermediate signal, for storing said second intermediate signal in dependence upon reception of a write clock signal, and for providing an encoded signal representative of the stored intermediate signal in dependence upon reception of a read clock signal; and
   second switch means for enabling selective transmission of said first intermediate signal and said encoded signal in dependence upon reception of said control signal.

8. The picture superposing circuit as claimed in claim 7, wherein said first picture controller means comprises:
   signal separator means coupled to receive said first intermediate signal representative of a first one of said first video signal and said second video signal, for separating said first intermediate signal to provide a vertical synchronizing signal and a horizontal synchronizing signal;
   vertical blank generator means coupled to receive said vertical synchronizing signal to provide a vertical blanking signal;
   field detector means coupled to receive said vertical and horizontal synchronizing signals, for detecting an odd and even state of a current field of said first intermediate signal to provide a field detected signal;

first gate means for providing a first logic signal in dependence upon reception of said field detected signal and said command signal representative of said picture superposing function; and second gate means for providing said control signal in dependence upon reception of said first logic signal, said vertical blanking signal and a window signal.

9. The picture superposing circuit as claimed in claim 7, wherein said second picture controller means comprises:

filter means coupled to receive said second intermediate signal representative of an opposite one of said first video signal and said second video signal, for low-pass filtering said second intermediate signal to provide a first luminance signal;

signal separator means coupled to receive said second intermediate signal representative of said opposite one of said first video signal and said second video signal, for separating said second intermediate signal to provide first color-difference signals, a vertical synchronizing signal and a horizontal synchronizing signal;

multiplexer means for multiplexing said first luminance signal and said first color-difference signals to provide a composite video signal;

read/write clock generator means coupled to receive said horizontal synchronizing signal from said first intermediate signal and said second intermediate signal respectively, for providing said read clock signal and said write clock signal;

first converter means for converting said composite video signal into a digital video signal in accordance with said write clock signal;

memory means for storing said digital video signal in selected addresses in accordance with said write clock signal, and for providing the stored digital video signal from said selected addresses in accordance with said read clock signal;

second converter means for converting said stored digital video signal into a second luminance signal and second color-difference signals in accordance with said read clock signal; and encoder means for encoding said second luminance signal and said second color-difference signals in accordance with a chrominance subcarrier signal to provide said encoded signal.

10. The picture superposing circuit as claimed in claim 8, wherein said first gate means is an OR gate, and said second gate means is an AND gate.

11. The picture superposing circuit as claimed in claim 7, wherein said first picture controller means comprises:

signal separator means coupled to receive said first intermediate signal representative of one of said first video signal and said second video signal, for separating said first intermediate signal to provide a vertical synchronizing signal and a horizontal synchronizing signal, and for detecting an odd and even state of a current field of said first intermediate signal to provide a field detected signal; and logic means for providing said control signal independence upon reception of said field detected signal, said command signal representative of a picture superposing function, a vertical blanking signal and a window signal.

12. The picture superposing circuit as claimed in claim 11, wherein said logic means comprises:

a OR gate for providing a first logic signal in dependence upon reception of said field detected signal and said command signal representative of a picture superposing function; and a AND gate for providing said control signal in dependence upon reception of said first logic signal, said vertical blanking signal and an window signal.

13. A picture superposing circuit, comprising:

input means having first and second terminals coupled to receive first and second video signals;

first switch means for enabling transmission of said first and second video signals to provide a first picture signal representative of one of said first video signal and said second video signal, and a second picture representative of an opposite one of said first video signal and said second video signal;

first signal separator means for separating said first picture signal to provide first synchronization signals and a chrominance subcarrier signal;

field detector means responsive to said first synchronization signals, for detecting an odd and even state of current fields of said first picture signal to provide a control signal representative of the odd and even fields in dependence upon reception of a command signal representative of a picture superimposition function for a visual display with a selected one of said first and second video signals superimposed upon a different one of said first and second video signals;

second switch means for enabling selective transmission of said first picture signal and an encoded signal representative of said second picture signal in dependence upon reception of said control signal representative of said odd and even fields to be displayed simultaneously as first and second pictures in a screen;

filter means coupled to receive said second picture signal, for low-pass filtering said second picture signal to provide a first luminance signal;

second signal separator means for separating said second picture signal to provide first color-difference signals and second synchronization signals;

multiplexer means for multiplexing said first luminance signal and said first color-difference signals to provide a composite video signal;

read/write clock generator means responsive to said first and second synchronizing signals, for providing a read clock signal and a write clock signal;

first converter means for converting said composite video signal into a digital video signal in accordance with said write clock signal;

memory means for storing said digital video signal in selected addresses in accordance with said write clock signal, and for providing the stored digital video signal from said selected addresses in accordance with said read clock signal;

second converter means for converting said stored digital video signal into a second luminance signal and second color-difference signals in accordance with said read clock signal; and encoder means for encoding said second luminance signal and said second color-difference signals in dependence upon said chrominance subcarrier signal to provide said encoded signal representative of said second picture signal.

14. The picture superposing circuit as claimed in claim 13, wherein said field detector means comprises:
vertical blank generator means responsive to said first synchronizing signals to provide a vertical blanking signal;
detector means coupled to receive said first synchronizing signals, for detecting a number of odd and even fields within said first picture signal to provide a field detected signal;
first gate means for providing a first logic signal in dependence upon reception of said field detected signal and said command signal representative of said picture superposing function; and
second gate means for providing said control signal in dependence upon reception of said first logic signal and said vertical blanking signal.

15. The picture superposing circuit as claimed in claim 14, wherein said first gate means is an OR gate, and said second gate means is an AND gate.

16. A method for superposing two pictures into a single screen, comprising the steps of:
receiving first and second video signals;
enabling transmission of said first and second video signals to provide a first picture signal representative of one of said first video signal and said second video signal, and a second picture signal representative of opposite one of said first video signal and said second video signal;
separating said first picture signal representative of one of said first video signal and said second video signal to provide a vertical synchronizing signal and a horizontal synchronizing signal;
detecting said vertical synchronizing signal to provide a vertical blanking signal;
detecting odd and even fields within said first picture signal to provide a control signal representative of the detected odd and even fields in dependence upon reception of a command signal representative of a picture superposing function, said vertical blanking signal and a window signal; and
enabling alternative transmission of said first picture signal and said second picture signal in dependence upon reception of said control signal representative of said odd and even fields to be displayed simultaneously as said first and second pictures in a screen.

17. The method as claimed in claim 16, further comprising the steps:
low-pass filtering said second picture signal to provide a first luminance signal;
separating said second picture signal to provide first color-difference signals, a vertical synchronizing signal and a horizontal synchronizing signal;
multiplexing said first luminance signal and said first color-difference signals to provide a composite video signal;
generating a read clock signal and a write clock signal in dependence upon reception of said horizontal synchronizing signal from said first picture signal and said second picture signal;
converting said composite video signal into a digital video signal in accordance with said write clock signal;
storing said digital video signal in selected addresses in accordance with said write clock signal;
reading the stored digital video signal from said selected addresses in accordance with said read clock signal;
converting said stored digital video signal into a second luminance signal and second color-difference signals in accordance with said read clock signal; and
encoding said second luminance signal and said second color-difference signals in accordance with chrominance subcarrier components of said first picture signal to provide said encoded signal representative of said second picture signal.

18. The method as claimed in claim 16, wherein said first picture is a main picture, and said second picture is a sub-picture.

19. A picture superposing circuit, comprising:
means for receiving a first video signal and a second video signal;
means for enabling transmission of said first and second video signals to provide a first intermediate signal and a second intermediate signal;
signal separator means coupled to receive said first intermediate signal representative of one of said first video signal and said second video signal, for separating said first intermediate signal to provide a vertical synchronizing signal and a horizontal synchronizing signal;
vertical blank generator means coupled to receive said vertical synchronizing signal to provide a vertical blanking signal;
field detector means coupled to receive said vertical and horizontal synchronizing signals, for detecting an odd and even state of current fields of said first intermediate signal to provide a field detected signal;
first gate means for providing a first logic signal in dependence upon reception of said field detected signal and a command signal representative of a picture superposing function for a visual display with one of said first and second video signals superimposed upon a different one of said first and second video signals on a display screen;
second gate means for providing a control signal in dependence upon reception of said first logic signal and said vertical blanking signal;
second controller means coupled to receive said second intermediate signal, for storing said second intermediate signal, and for providing an encoded signal representative of the stored second intermediate signal; and
means for enabling selective transmission of said first intermediate signal and said encoded signal in dependence upon reception of said control signal.

20. A picture superposing circuit, comprising:
means for receiving a first video signal and a second video signal;
means for enabling transmission of said first and second video signals to provide a first intermediate signal and a second intermediate signal;
first controller means responsive to said first intermediate signal, for providing a control signal indicative of number of odd and even fields within said first intermediate signal in dependence upon reception of a command signal representative of a picture superimposition function for a visual display with a selected one of said first and second video signals superimposed upon a different one of said first and second video signals on a display screen;

filter means coupled to receive said second intermediate signal representative of opposite one of said first video signal and said second video signal, for low-pass filtering said second intermediate signal to provide a first luminance signal;

signal separator means coupled to receive said second intermediate signal representative of opposite one of said first video signal and said second video signal, for separating said second intermediate signal to provide first color-difference signals, a vertical synchronizing signal and a horizontal synchronizing signal;

multiplexer means for multiplexing said first luminance signal and said first color-difference signals to provide a composite video signal;

read/write clock generator means coupled to receive said horizontal synchronizing signal from said first intermediate signal and said second intermediate signal respectively, for providing a read clock signal and a write clock signal;

first converter means for converting said composite video signal into a digital video signal in accordance with said write clock signal;

memory means for storing said digital video signal in selected addresses in accordance with said write clock signal, and for providing the stored digital video signal from said selected addresses in accordance with said read clock signal;

second converter means for converting said stored digital video signal into a second luminance signal and second color-difference signals in accordance with said read clock signal;

encoder means for encoding said second luminance signal and said second color-difference signals in accordance with chrominance subcarrier components of said first intermediate signal to provide an encoded signal; and means for enabling selective transmission of said first intermediate signal and said encoded signal in dependence upon reception of said control signal.

21. A picture superposing circuit,
means for receiving a first video signal and a second video signal;
means for enabling transmission of said first and second video signals to provide a first intermediate signal and a second intermediate signal;
signal separator means coupled to receive said first intermediate signal representative of one of said first video signal and said second video signal, for separating said first intermediate signal to provide a vertical synchronizing signal and a horizontal synchronizing signal, and for detecting odd and even fields of said first intermediate signal to provide a field detected signal indicative of the results of the detection;
logic means responsive to said field detected signal, said command signal, for generating said control signal in dependence upon reception of a vertical blanking signal;
second controller means coupled to receive said second intermediate signal, for storing said second intermediate signal, and for providing an encoded signal representative of the stored second intermediate signal; and
means for enabling selective transmission of said first intermediate signal and said encoded signal in dependence upon reception of said control signal.

22. The picture superposing circuit as claimed in claim 21, wherein said logic means comprises:
an OR gate for providing a first logic signal in dependence upon reception of said field detected signal and said command signal representative of said picture superposing function; and
an AND gate for providing said control signal in dependence upon reception of said first logic signal, said vertical blanking signal.

23. A method for superposing a plurality of pictures onto a single screen, comprising the steps of:
receiving first video signals representative of a first picture and second video signals representative of a second picture;
enabling transmission of said first and second video signals to provide first intermediate signals representative of ones of said first and second video signals and second intermediate signals representative of opposite ones of said first and second video signals;
producing a control signal indicative of odd and even fields of said first intermediate signal in dependence upon a command signal representative of a picture superimposition function for a visual display with selected ones of said first and second video signals superimposed upon different ones of said first and second video signals on a display screen;
producing encoded signals in dependence upon said second intermediate signals; and
enabling transmission of said first intermediate signals and said encoded signals in dependence upon said control signal to enable said visual display with selected ones of said first and second video signals superimposed upon different ones of said first and second video signals on said display screen.

24. The method as claimed in claim 23, wherein the step of producing said control signal comprises the steps of:
separating said first intermediate signals into synchronization signals;
generating a vertical blanking signal in dependence upon said synchronization signals;
detecting a number of odd and even fields within said first intermediate signals to provide a field detected signal;
generating a first logic signal in dependence upon reception of said field detected signal and said command signal representative of said picture superposing function; and
generating said control signal in dependence upon reception of said first logic signal and said vertical blanking signal.

25. The method as claimed in claim 24, wherein the step of producing said encoded signals comprises the steps of:
low-pass filtering said second intermediate signals to provide first luminance signals;
separating said second intermediate signals into first color-difference signals and synchronizing signals;
multiplexing said first luminance signals and said first color-difference signals to provide composite video signals;
generating read and write clock signals in dependence upon synchronizing signals of said first intermediate signals and said second intermediate signals respectively;

converting said composite video signals into digital video signals in accordance with said write clock signal;

storing said digital video signals in selected addresses of a memory in accordance with said write clock signal, and for producing the stored digital video signals from said selected addresses of said memory in accordance with said read clock signal;

converting said stored digital video signals into second luminance signal and second color-difference signals in accordance with said read clock signal; and encoding said second luminance signals and said second color-difference signals in accordance with chrominance subcarrier components of said first intermediate signals to provide said encoded signals.

* * * * *

UNITED STATES PATENT AND TRADEMARK OFFICE
CERTIFICATE OF CORRECTION

PATENT NO. : 5,309,238  Page 1 of 2
DATED : May 3, 1994
INVENTOR(S) : Jeom-han Bae It is certified that error appears in the above-indentified patent and that said Letters Patent is hereby corrected as shown below:

On the title page:

Item [54], and col. 1: After "CIRCUIT", Insert -- FOR SUPERPOSING PLURAL TELEVISON PICTURES ON A SINGLE SCREEN-- .

Column 1, Line 33, Change "means which receives" to --coupled to receive--;

Line 38, After "terminal", Change comma "," to semicolon --;-- ;

Column 3, Line 28, Preceding "sub", Change "the" to --a-- ;

Line 30, Change "sign" to --signal-- ;

Line 61, After 60, Insert --in-- ;

Column 5, Line 8, After "field", Change period "." to --period-- ;

Line 14, Change "superpose" to --superposed-- .

UNITED STATES PATENT AND TRADEMARK OFFICE
CERTIFICATE OF CORRECTION

PATENT NO.   :   5,309,238   Page 2 of 2
DATED        :   May 3, 1994
INVENTOR(S)  :   Jeom-han Bae It is certified that error appears in the above-indentified patent and that said Letters Patent is hereby corrected as shown below:

Column 7,   Line 66,   Change "independence" to --in dependence-- ;

Column 10,  Line 40,   After "with", Insert --a selected-- ;

Column 11,  Line 42,   After "circuit," Insert --comprising :-- .

Signed and Sealed this

First Day of November, 1994

Attest:

BRUCE LEHMAN

Attesting Officer

Commissioner of Patents and Trademarks